(12) United States Patent  (10) Patent No.: US 11,593,904 B2
McCreight  (45) Date of Patent: Feb. 28, 2023

(54) SYSTEM AND METHOD FOR COLLECTING FORENSIC DATA VIA A MOBILE DEVICE

(71) Applicant: Open Text Holdings, Inc., San Mateo, CA (US)

(72) Inventor: Shawn McCreight, Pasadena, CA (US)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 0 days.

(21) Appl. No.: 17/680,905

(22) Filed: Feb. 25, 2022

(65) Prior Publication Data

US 2022/0180464 A1 Jun. 9, 2022

Related U.S. Application Data

(63) Continuation of application No. 16/921,203, filed on Jul. 6, 2020, now Pat. No. 11,301,947, which is a continuation of application No. 14/192,846, filed on Feb. 27, 2014, now Pat. No. 10,740,858.

(60) Provisional application No. 61/771,047, filed on Feb. 28, 2013.

(51) Int. Cl.
  *G06Q 50/26* (2012.01)
  *G06Q 10/06* (2012.01)
  *H04W 4/00* (2018.01)

(52) U.S. Cl.
  CPC ............. *G06Q 50/26* (2013.01); *G06Q 10/06* (2013.01); *H04W 4/00* (2013.01)

(58) Field of Classification Search
  CPC .......... G06Q 50/26; G06Q 10/06; H04W 4/00
  See application file for complete search history.

(56) References Cited

U.S. PATENT DOCUMENTS

| | | | | |
|---|---|---|---|---|
| 2004/0260733 | A1* | 12/2004 | Adelstein | H04L 63/123 709/224 |
| 2009/0150906 | A1* | 6/2009 | Schmidt | G06Q 50/18 719/317 |
| 2009/0164522 | A1* | 6/2009 | Fahey | H04L 63/30 |
| 2012/0322422 | A1* | 12/2012 | Frecks, Jr. | H04L 63/02 707/769 |

OTHER PUBLICATIONS

E-Warrants, http://www.nascio.org/portals/0/awards/nominations2008/2008/2008UT2-e-Warrants%20Submission%206.2.08fs1fs.pdf (retrieved on Aug. 25, 2016). (Year: 2016) (Year: 2016).*

* cited by examiner

*Primary Examiner* — Julie M Shanker
(74) *Attorney, Agent, or Firm* — Sprinkle IP Law Group

(57) ABSTRACT

Embodiments of search systems that leverage the search or access activities of a core group of users to improve search functionality and performance of such search systems are disclosed. Specifically, embodiments may utilize users' search activity to generate clusters of users and associated labels for those clusters. These clusters can be leveraged during a search to generate suggestions for a user conducting the search.

21 Claims, 6 Drawing Sheets

SYSTEM AND METHOD FOR COLLECTING FORENSIC DATA VIA A MOBILE DEVICE

CROSS-REFERENCE TO RELATED APPLICATION(S)

This application is a continuation of, and claims a benefit of priority under 35 U.S.C. 120 of the filing date of U.S. patent application Ser. No. 16/921,203 filed Jul. 6, 2020, entitled "SYSTEM AND METHOD FOR COLLECTING FORENSIC DATA VIA A MOBILE DEVICE," issued as U.S. Pat. No. 11,301,947, which is a continuation of, and claims a benefit of priority under 35 U.S.C. 120 of the filing date of U.S. patent application Ser. No. 14/192,846 filed Feb. 27, 2014, entitled "SYSTEM AND METHOD FOR COLLECTING FORENSIC DATA VIA A MOBILE DEVICE," issued as U.S. Pat. No. 10,740,858, which claims a benefit of priority under 35 U.S.C. § 119 to U.S. Provisional Application No. 61/771,047, filed Feb. 28, 2013, entitled "SYSTEM AND METHOD FOR COLLECTING FORENSIC DATA VIA A MOBILE DEVICE," which are hereby incorporated herein for all purposes.

COPYRIGHT NOTICE

A portion of the disclosure of this patent document contains material to which a claim for copyright is made. The copyright owner has no objection to the facsimile reproduction by anyone of the patent document or the patent disclosure as it appears in the Patent and Trademark Office patent file or records, but reserves all other copyright rights whatsoever.

TECHNICAL FIELD

This invention relates generally to forensic data collection, and more particularly, to quickly collecting forensic data in the field via a mobile device.

BACKGROUND

It is often desirable to collect forensic data quickly in the field without having to invoke specialized computer equipment or having to be an expert in computer forensics. Specifically, it is often desirable to collect forensic data with equipment that field officers often have at hand, such as mobile phones, tablets, or the like. Once collected via such standard devices, the collected data can be taken to a forensic professional for full analysis as required.

The gathering of forensic data for criminal investigations often requires a search warrant. A law enforcement official typically generates the search warrant identifying the object and/or location of the search. The law enforcement official takes the search warrant to a judge for approval and presents the approved search warrant to an individual being investigated prior to conducting the search. If during the investigation the law enforcement official determines that other documents or areas need to be investigated which are beyond the scope of the current warrant, the law enforcement officer returns to his/her headquarters to obtain a new warrant. However, by the time that the new warrant is approved and the law enforcement officer returns to the field to resume the search, the material to be investigated may have disappeared.

Accordingly, what is desired is a system and method for efficiently creating, reviewing, approving and transmitting search warrants to the investigating officers to allow efficient and quick collection of forensic data.

Accordingly, what is desired are systems and methods for improving the functionality of searching in DAM or other types of systems to, for example, improve computing performance of such systems, reduce the burden of implementing such searches and improve the results of such searches.

SUMMARY

Embodiments of the present invention are directed to a server and method for conducting forensic investigations by investigators on an investigations field. The server includes a processor, and a memory that stores program instructions for being executed by the processor. Such program instructions include: receiving a digital search warrant including one or more search parameters for conducting a forensic investigation; notifying a mobile device of the digital search warrant; receiving a user command to download the digital search warrant in response to the notifying; and downloading the digital search warrant to the mobile device in response to the received user command. According to one embodiment, the digital search warrant is configured to be electronically parsed by the mobile device for automatically identifying and collecting data from a target device in the investigations field during a forensic investigation. The automatically identifying and collecting of the data from the target device is done without modifying a state of the target device.

According to one embodiment of the invention, the one or more search parameters include one or more search terms, and/or one or more file types.

According to one embodiment of the invention, the mobile device is a cellular phone.

According to one embodiment of the invention, the collected data is stored in a memory of the mobile device.

According to one embodiment of the invention, the digital search warrant is downloaded to the mobile device from a website.

According to one embodiment of the invention, the mobile device is configured to be coupled to the target device over a universal serial bus port. The data from the target device is collected over the universal serial bus port.

According to another embodiment, the method for conducting forensic investigations by investigators on an investigations field includes downloading a digital search warrant to a mobile device, the digital search warrant including one or more search parameters; coupling the mobile device to a target device in the investigations field; parsing the digital search warrant by the mobile device; and automatically identifying and collecting by the mobile device data from the target device based on the parsed digital search warrant during a forensic investigation. The automatically identifying and collecting of the data is done without modifying a state of the target device.

According to one embodiment of the invention, the mobile device stores an operating system. The operating system is configured to be invoked by the target device during a reboot of the target device. According to one embodiment, the operating system automatically invokes instructions for conducting the forensic investigation of the target device. The instructions are stored in a memory of the mobile device. The instructions may include parsing the digital search warrant, and identifying and collecting the data from the target device. The instructions may also include blocking write commands directed to the target device.

These and other features, aspects and advantages of the present invention will be more fully understood when considered with respect to the following detailed description, appended claims, and accompanying drawings. Of course, the actual scope of the invention is defined by the appended claims.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

In general terms, embodiments of the present invention are directed to a system and method for conducting forensic investigations at an investigations field using a mobile device normally carried by law enforcement officers, such as, for example, a cellular phone, smart phone, tablet, and/or the like. New or modified search warrants are downloaded to the mobile device over a data communications network. In this manner, the law enforcement officer may receive the search warrant at any time and at any location, including while the law enforcement officer is at the investigations field.

The search warrants are digital search warrants that may be processed by forensic investigations software. The digital search warrants describe what the investigation software will do to conduct a search without requiring human interpretation of the search parameters. In this regard, the forensic investigations software parses the digital search warrant and automatically identifies evidence in a target device that is within the scope of the search warrant. The identified evidence is collected and stored in the memory of the mobile device, without modifying a state of the target device.

Although embodiments of the present invention are described in terms of search warrants which are court orders issued by a judge, a person of skill in the art should recognize that embodiments of the present invention may also extend to non-legal documents that may describe the search parameters of a forensic investigation, such as, for example, documents used by military personnel to obtain data from a suspect's computer, documents used by parole officers to quickly gather evidence relating to a parolee, and documents used by corporate security departments to perform speedy audits.

Figure 1:
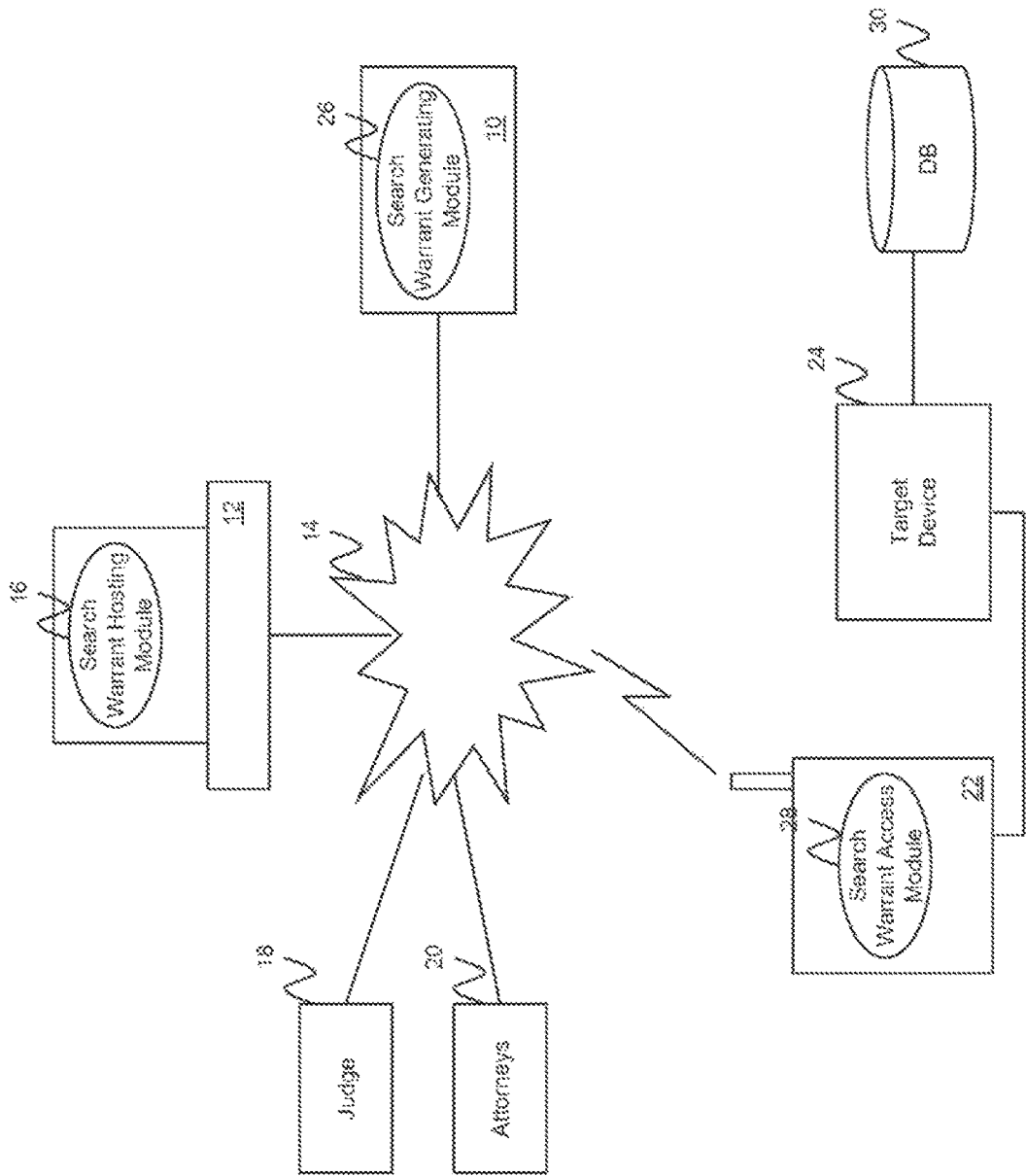
FIG. 1 is a schematic block diagram of a system for conducting forensic investigations by investigators on an investigations field, according to one embodiment of the invention.

FIG. 1 is a schematic block diagram of a system for conducting forensic investigations by investigators on an investigations field, according to one embodiment of the invention. The system includes a generating computer device 10 located, for example, at a law enforcement headquarters, which is configured to generate a digital search warrant in response to, for example, a request by a law enforcement officer.

The generating computer device 10 is coupled to a server 12 over a data communications network 14. The data communications network 14 may be a local area network, private wide area network, or a public wide area network like the Internet.

According to one embodiment of the invention, the server 12 includes a search warrant hosting module 16 for receiving uploaded digital search warrants, transmitting those search warrants to the appropriate officers, and the like. The search warrant hosting module provides a website that different users may access to take different actions with respect to search warrants. For example, the generating computer device 10 may access the website for uploading generated search warrants to the website. The website may provide separate accounts for each user accessing the website along with separate security measures and rights with respect to the digital search warrants. For example, the website may provide separate accounts for different law enforcement officers, judges 18, attorneys 20, and the like. The website may provide to law enforcement officers that generate search warrants, either via the generating computer device 10 or directly via the website, first interactive links for generating and/or uploading a digital search warrant. The website may provide to judges 18 second interactive links to approve or reject an uploaded search warrant. The website may also provide to attorneys representing clients to whom the search warrants pertain, third interactive links for objecting to an uploaded search warrant.

Law enforcement officers on an investigations field often carry mobile devices 22 which may also be used to access the website 16. The mobile devices 22 may be cellular phones, personal digital assistants (PDAs), electronic tablets, laptops, or any mobile computing device conventional in the art. The mobile devices may be configured with a dedicated search warrant access module 28 for accessing the website/server and downloading digital search warrants generated for the law enforcement officers. According to this embodiment, the access module 28 may be described as a dedicated application included on the mobile device that allows interaction with the server 12 and/or website without invoking a web browser. The website may also be accessed via a standard web browser. According to one embodiment, the website provides one or more interactive links accessible to users of the mobile devices 22 for downloading digital search warrants to the mobile devices.

Each of the generating computer device 10, server 12, and mobile devices 22 (collectively referenced as computing devices) includes a central processing unit (CPU) for executing software instructions and interacting with other system components for performing the functions described herein. The computing devices 10, 12, 22 further include a mass storage device such as, for example, a hard disk drive or drive array, for storing various applications and data used for implementing the system. The computing devices further include an addressable memory for storing software instructions to be executed by the CPU. The memory may be implemented using a standard memory device, such as, for example, a random access memory (RAM). According to one embodiment, the memory stores a number of software objects or modules used for implementing the various functionalities of the system. For example, the memory of the generating computer device 10 may store a search warrant generating module 26 for generating search warrants. The memory of the server 12 may store instructions for providing the website 16. The memory of the mobile devices 22 may include the dedicated search warrant access module as well as other instructions for downloading search warrants and executing searches based on the search warrants. A person of skill in the art should recognize, that all or a portion of the various modules may be implemented via firmware, hardware, or a combination of software, firmware, and/or hardware.

The computing devices 10, 12, 22 also include various input and output units conventional in the art such as, for example, keyboards, keypads, touch-screen units, display units, and the like. The computing devices may further include wired and/or wireless data communication links for accessing the data communications network 14, such as, for example, direct wires, infrared data ports, wireless communications links, or any other communications medium known in the art.

The mobile device 22 further includes a wired or wireless data communications link 42 for coupling to a target device 24. The data communications link may be, for example, a universal serial bus (USB) port or the like. The target device 24 may be any computing device that may be subject to a forensic investigation, such as, for example, a desktop, laptop, cellular phone, electronic tablet, or any other computing device conventional in the art. The target device 24 is coupled to a mass storage device 30 which stores data that may be collected by the mobile device 22 in response to a search warrant. The target device and the mass storage device are collectively referred to as the target device.

Figure 2:
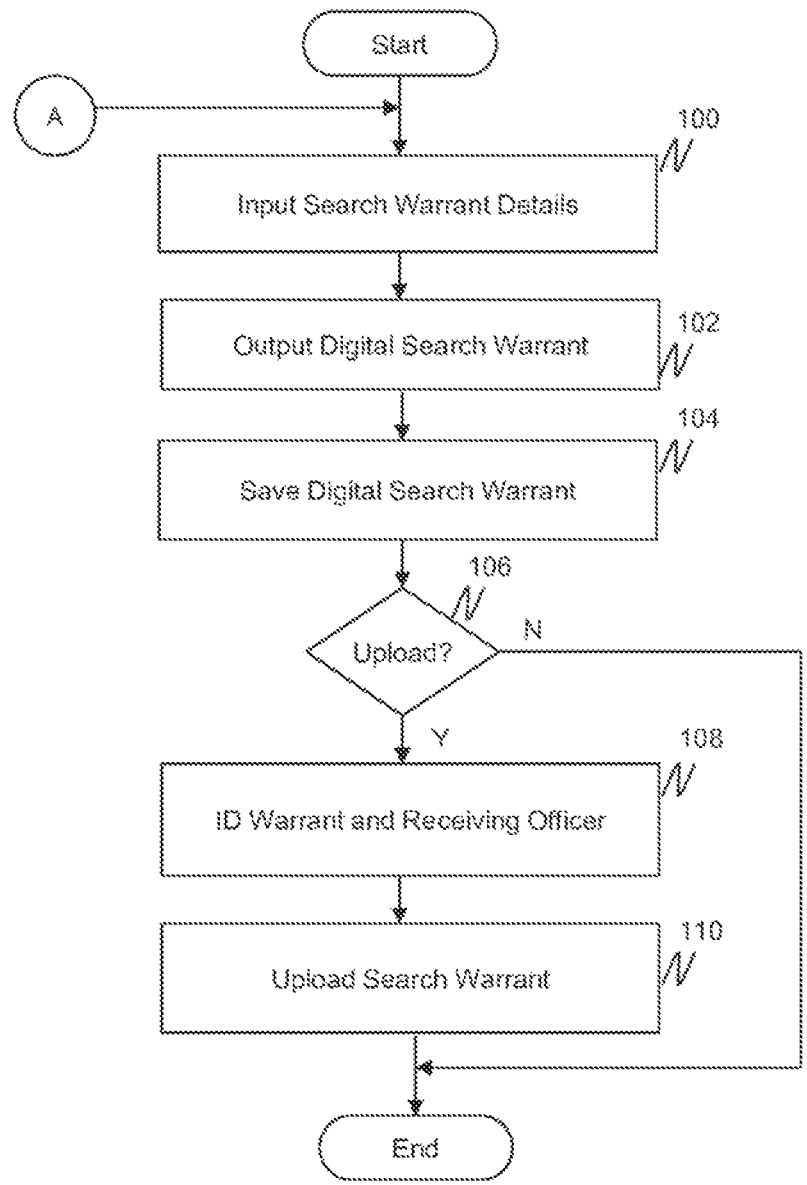
FIG. 2 is a flow diagram of a process for generating and uploading a digital search warrant according to one embodiment of the invention.

FIG. 2 is a flow diagram of a process for generating and uploading a digital search warrant according to one embodiment of the invention. In act 100, a local or remote user of the generating computer device 10 invokes the search warrant generating module 26 to input search warrant details. In this regard, the search warrant generating module 26 may prompt the user to enter information such as the location, object, keywords, and file types to be searched. The search warrant generating module 26 may also prompt the user to enter information on the enforcement officer for whom the search warrant is being generated, information on the user generating the search warrant, and/or information on the judge and attorneys involved. The search warrant generating module 26 receives the search warrant details from the user via input devices provided by the generating computing device 10 (or remotely over a data communication network), and in act 102, outputs a digital search warrant based on the input details. According to one embodiment of the invention, the digital search warrant is human-readable as well as machine-readable. As such, the digital search warrants may be generated using a markup language, such as, for example, XML. The search warrants may also be generated using another appropriate language conventional in the art.

In act 104, the search warrant generating module 26 saves the generated digital search warrant in a user identified folder or directory.

In act 106, the search warrant generating module 26 determines whether the user has selected an option to upload the generated search warrant to the server 12. If the answer is YES, the search warrant generating module 26 identifies in act 108, based on user entered information, the search warrant to upload, and the officer that is to receive the search warrant.

In act 110, the search warrant is uploaded to the website for the particular enforcement officer over the data communications network 14.

Figure 3:
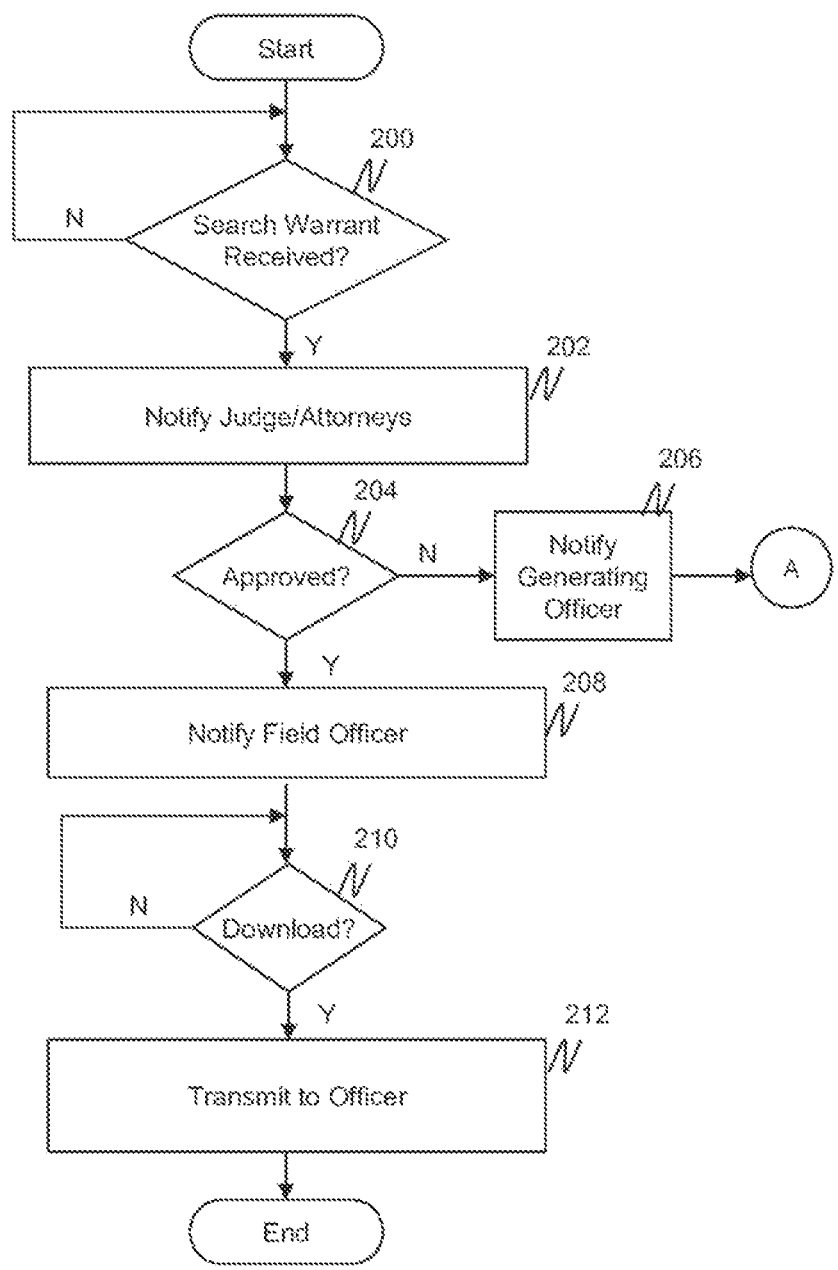
FIG. 3 is a flow diagram of a process for receiving a digital search warrant and downloading the search warrant to an appropriate enforcement officer according to one embodiment of the invention.

FIG. 3 is a flow diagram of a process for receiving a digital search warrant and downloading the search warrant to the appropriate enforcement officer according to one embodiment of the invention.

In act 200, the search warrant hosting module 16 determines whether a search warrant was received. According to one embodiment, the search warrant is uploaded by the generating computer device 10. The search warrant may also be generated by the website in response to information directly input into the website by a user generating the search warrant.

If the search warrant is received, the search warrant hosting module 16 takes the optional act of notifying the judge 18 and/or attorneys 20 about the search warrant in act 202. The notification may be to prompt a recipient of the notification to take a particular action. For example, the notification to the judge may be transmitted to request approval of the search warrant. The notification to the attorneys may be transmitted to give them notice of the search warrant and give them opportunity to object to the search. The judge and/or attorneys may access their accounts on the website to view or modify the text of the search warrant. According to one embodiment, the judge and/or attorneys may have a dedicated application installed in their end user devices to access the server 12 without invoking a web browser. According to one embodiment, the access to the website may be via the web browser.

In act 204, the search warrant hosting module 16 determines whether it has received user input (from the judge) indicating approval of the search warrant. If the search warrant is modified or not approved, the search warrant hosting module 16 marks the search warrant accordingly, and notifies, in act 206, the user who generated the search warrant of this fact for prompting the user to take appropriate action in response. The notification may include information as to why the search warrant was not approved or a corrected version of the warrant to be used. For example, the notification may include information as to any search terms in the digital search warrant objected by the attorneys. Based on this information, the process of FIG. 2 is re-executed to generate a modified search warrant and the modified search warrant is re-uploaded to the website. In this manner, warrants may be modified and provided to the field officers in real time.

According to one embodiment of the invention, the digital search warrant is a document generated using a computer language that allows parsing by a machine as well as to be output as text that may be read by a human. During the parsing, the digital search warrant may be segmented into discrete segments as is described in further detail in U.S. patent application Ser. No. 14/024,369, filed on Sep. 11, 2013, the content of which is incorporated herein by reference.

If the search warrant is approved, the search warrant hosting module 16 marks the search warrant accordingly, and proceeds to transmit a notification of this fact, in act 208, to the field officer that is to conduct the search. The notifications in acts 202, 206, and 208 may be, for example, emails, SMS messages, telephone messages, or any other visual and/or audio notifications conventional in the art. The notifications may also be visual indications provided to users accessing the website. For example, when the field officer accesses his account, he may be presented with a list of search warrants that have been approved and are waiting to be downloaded.

In act 210, the search warrant hosting module 16 determines whether the approved search warrant is to be downloaded. For example, the field officer may invoke the search warrant access module 28 on his mobile device 22 to access his account on the website. Once on the website, the field officer may be presented with a list of approved search warrants, and further presented with an option to download the listed search warrants. By accessing the search warrants in this manner, the field officer need not be present at the headquarters generating or modifying a search warrant, in order for him to receive the search warrant.

In response to positive indication by the field officer that a particular search warrant is to be downloaded, the search warrant is downloaded to the field officer's mobile device via the data communications network 14. The downloaded search warrant is stored in the memory of the mobile device 22.

Figure 4:
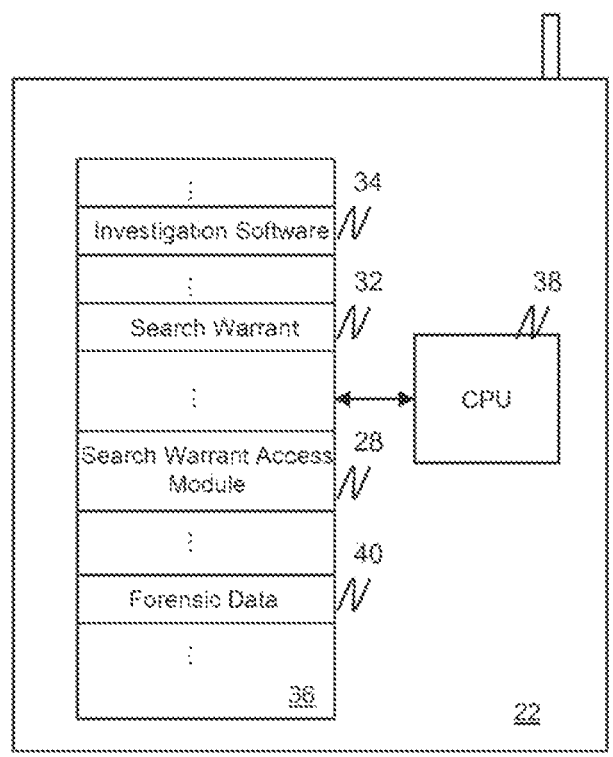
FIG. 4 is a schematic block diagram of a mobile device acting as a holder of a search warrant and an evidence collector according to one embodiment of the invention.

FIG. 4 is a schematic block diagram of the mobile device 22 according to one embodiment of the invention. The mobile device 22 includes, among other elements, a processor 38 coupled to a memory 36. The processor 38 is configured to execute computer program instructions stored in the memory. Such computer program instructions include, among others, instructions for conducting forensic investigation 34 of the target device 24 (hereinafter referred to as investigation software). In this regard, the investigation software includes instructions for implementing a stripped down version of an operating system, such as, for example, the Windows PE OS. The operating system in the mobile device is used to boot up the target device 24 instead of the target device's operating system. The investigation software further includes instructions to parse an electronic search warrant 32 also stored in the memory, for determining the scope of a search to be conducted on the target device 24 (e.g. what is to be searched, which keywords are to be used, what types of files are to be retrieved, etc.).

The search warrant access module 28 may also be stored in the memory. The search warrant access module 28 may be invoked for accessing the server 12 and downloading search warrants from the server. In this manner, the mobile device acts as the holder of the search warrant. The mobile device also acts as an evidence collector to collect forensic data 40 within the scope of the search warrant. The collected forensic data 40 is also stored in the memory of the mobile device.

Figure 5:
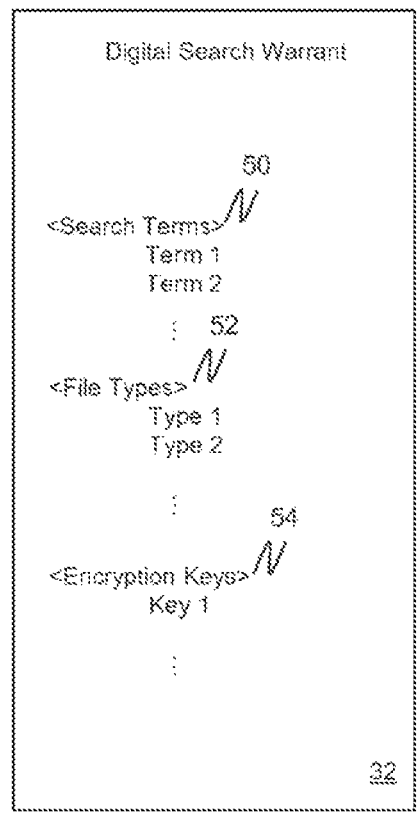
FIG. 5 is a schematic block diagram of a digital search warrant stored in a memory of the mobile device of FIG. 4 according to one exemplary embodiment.

FIG. 5 is a schematic block diagram of the digital search warrant 32 stored in the memory of the mobile device 22 according to one exemplary embodiment. The digital search warrant includes, for example, one or more search terms 50, file types 52, and the like. These search parameters are used by the forensic investigation software for retrieving data from the target device 24. The digital search warrant 32 may also include one or more public encryption keys 54. These public keys can be used to encrypt the data that is collected from the target device so that it can only be viewed by parties in possession of the corresponding private key.

Figure 6:
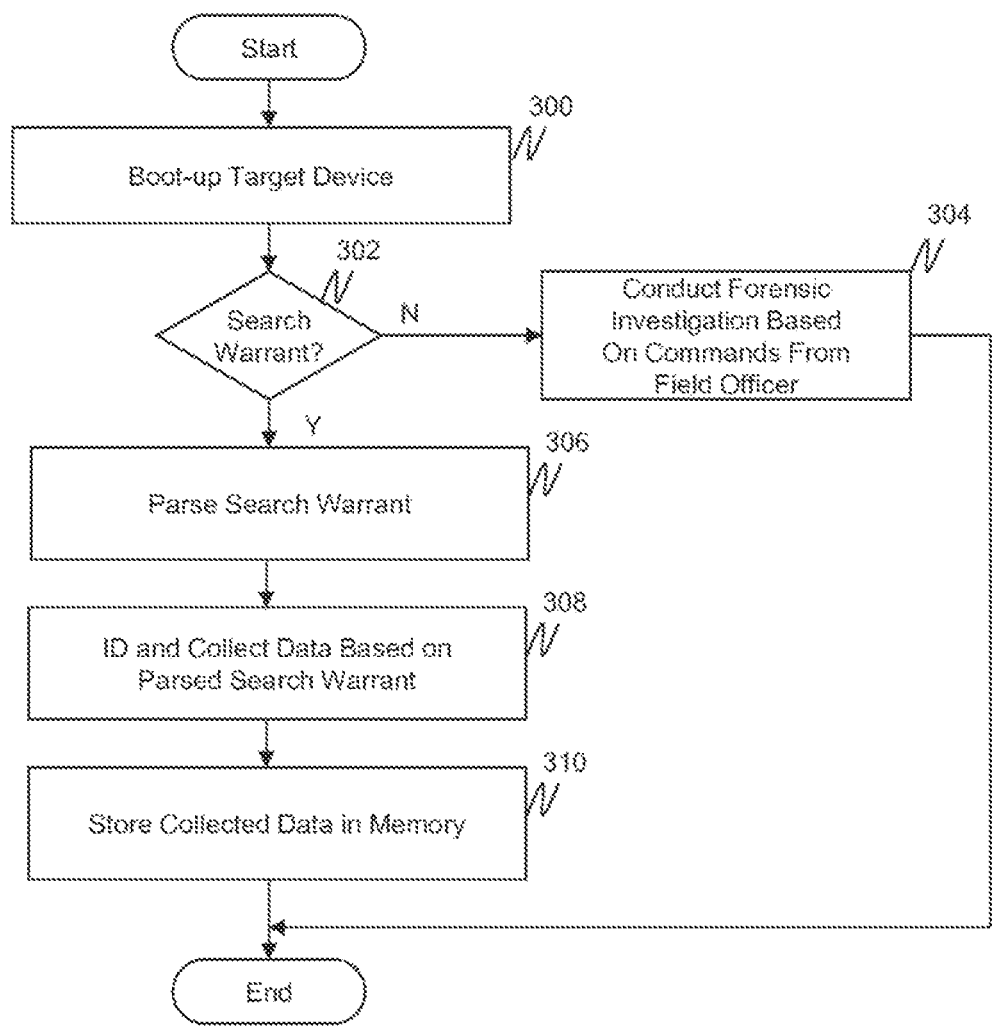
FIG. 6 is a flow diagram of a process for conducting a forensic investigation of a target device according to one embodiment of the invention.

FIG. 6 is a flow diagram of a process for conducting a forensic investigation of a target device according to one embodiment of the invention. The process starts, and in act 300, the field officer couples the mobile device 22 to the target device 24 via the data communications link 42, and causes the rebooting of the target device. During the rebooting process, the field officer changes the BIOS configuration of the target device to boot from a device connected to its USB port. The target device thus boots up using the operating system stored in the memory of the mobile device 22 instead of the target's operating system. The operating system in the memory of the mobile device automatically runs the investigation software 34 also stored in the memory of the mobile device 22.

The investigation software, in act 302, determines whether there is a digital search warrant to be executed. If the answer is NO, the investigation software proceeds, in act 304, to conduct investigation of the target based on commands from the field officer.

If, however, a search warrant exists, the investigation software proceeds to parse the search warrant in act 306 to identify the search parameters to be used during the forensic investigation of the target device.

In act 308, the investigation software proceeds to identify and collect data from the target device based on the parsed parameters. For example, if the parsed search parameters indicate that files having a particular file extension are to be collected, the investigation software identifies and collects files having the particular file extension. Also, if the parsed search parameters indicate that documents having particular keywords are to be collected, the investigation software identifies and collects files having the particular keywords. In this regard, the investigation software is configured to control the write blocking of the target device to retain forensic integrity during the investigation process. According to one embodiment, the investigation software is configured to block write commands directed to the target device that would change a state of the target device 24 or its associated mass storage device 30. Such commands may include, for example, commands that would modify device metadata, filesystem metadata, other types of data, and the like. Any write blocker technology conventional in the art may be used. By filtering out the write commands, the investigation software may collect data from the target device without making any change to the target device 24 or its associated mass storage device 30.

In act 310, the investigation software stores the collected data in the memory of the mobile device in a user specified folder or directory. The collected data may then be taken back to the headquarters to be downloaded onto the device of an expert in computer forensics. The expert may run a full analysis of the collected data, run reports, and the like.

The processes of FIGS. 2, 3, and 6 may be described in terms of a software routine executed by the corresponding CPU based on instructions stored in memory. The instructions may also be stored in any other non-transitory computer readable media such as, for example, a CD-ROM, flash drive, or the like. A person of skill in the art should recognize, however, that the processes may be executed via hardware, firmware (e.g. via an ASIC), or in any combination of software, firmware, and/or hardware. Furthermore, the sequence of acts of the processes are not fixed, but can be altered into any desired sequence as recognized by a person of skill in the art.

It is the applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A system, comprising:
   a processor; and
   a non-transitory computer readable medium comprising instructions for:
   obtaining a digital search warrant including a search parameter for a target device; and
   providing the digital search warrant to a forensic investigation application executing on a device, wherein the forensic investigation application on the device is adapted for:
   booting the target device over a network between the device and the target device using an operating system stored in a memory at the device such that the operating system is executing from the memory of the device, and the forensic investigation application is executing on the operating system to search the target device without user involvement;
   identifying the search parameter of the digital search warrant to use on the target device, the search parameter of the digital search warrant including a keyword or identifying a type of file;
   searching files at the target device over the network between the device and the target device to identify a set of files on the target device that include the keyword of the search parameter or are the type of file identified in the search parameter included in the digital search warrant, wherein when the search parameter includes the identifier for the type of file, the searching of the files at the target device comprises only searching the files of the type of file identified in the search parameter without modification of a state of the target device; and
   retrieving the identified set of files without modifying the state of the target device, wherein the retrieving is done by the forensic investigation application executing at the device over the network between the device and the target device.

2. The system of claim 1, wherein the searching of files of the target device comprises blocking write commands to the target device.

3. The system of claim 1, wherein the instructions are further for determining that the digital search warrant has been approved before the digital search warrant is provided to the forensic investigation application.

4. The system of claim 1, wherein the operating system is a native operating system of the device.

5. The system of claim 1, wherein the digital search warrant comprises a machine-readable segment and a segment adapted to generate human-readable text.

6. The system of claim 1, wherein the searching of files of the target device comprises blocking write commands to the target device that would change the state of the target device.

7. The system of claim 1, wherein the retrieved identified set of files are stored in encrypted form.

8. A method, comprising:
   obtaining a digital search warrant including a search parameter for a target device; and
   providing the digital search warrant to a forensic investigation application executing on a device, wherein the forensic investigation application on the device is adapted for:
   booting the target device over a network between the device and the target device using an operating system stored in a memory at the device such that the operating system is executing from the memory of the device, and the forensic investigation application is executing on the operating system to search the target device without user involvement;
   identifying the search parameter of the digital search warrant to use on the target device, the search parameter of the digital search warrant including a keyword or identifying a type of file;
   searching files at the target device over the network between the device and the target device to identify a set of files on the target device that include the keyword of the search parameter or are the type of file identified in the search parameter included in the digital search warrant, wherein when the search parameter includes the identifier for the type of file, the searching of the files at the target device comprises only searching the files of the type of file identified in the search parameter without modification of a state of the target device; and
   retrieving the identified set of files without modifying the state of the target device, wherein the retrieving is done by the forensic investigation application executing at the device over the network between the mobile device and the target device.

9. The method of claim 8, wherein the searching of files of the target device comprises blocking write commands to the target device.

10. The method of claim 8, further comprising: determining that the digital search warrant has been approved before the digital search warrant is provided to the forensic investigation application.

11. The method of claim 8, wherein the operating system is a native operating system of the device.

12. The method of claim 8, wherein the digital search warrant comprises a machine-readable segment and a segment adapted to generate human-readable text.

13. The method of claim 8, wherein the searching of files of the target device comprises blocking write commands to the target device that would change the state of the target device.

14. The method of claim 8, wherein the retrieved identified set of files are stored in encrypted form.

15. A non-transitory computer readable medium comprising instructions for:
   obtaining a digital search warrant including a search parameter for a target device; and
   providing the digital search warrant to a forensic investigation application executing on a device, wherein the forensic investigation application on the device is adapted for:
   booting the target device over a network between the device and the target device using an operating system stored in a memory at the device such that the operating system is executing from the memory of the device, and the forensic investigation application is executing on the operating system to search the target device without user involvement;
   identifying the search parameter of the digital search warrant to use on the target device, the search parameter of the digital search warrant including a keyword or identifying a type of file;
   searching files at the target device over the network between the device and the target device to identify a set of files on the target device that include the keyword of the search parameter or are the type of file identified in the search parameter included in the digital search warrant, wherein when the search parameter includes the identifier for the type of file, the searching of the files at the target device comprises only searching the files of the type of file identified in the search parameter without modification of a state of the target device; and retrieving the identified set of files without modifying the state of the target device, wherein the retrieving is done by the forensic investigation application executing at the device over the network between the device and the target device.

16. The non-transitory computer readable medium of claim 15, wherein the searching of files of the target device comprises blocking write commands to the target device.

17. The non-transitory computer readable medium of claim 15, further comprising instructions for determining that the digital search warrant has been approved before the digital search warrant is provided to the forensic investigation application.

18. The non-transitory computer readable medium of claim 15, wherein the operating system is a native operating system of the device.

19. The non-transitory computer readable medium of claim 15, wherein the digital search warrant comprises a machine-readable segment and a segment adapted to generate human-readable text.

20. The non-transitory computer readable medium of claim 15, wherein the searching of files of the target device comprises blocking write commands to the target device that would change the state of the target device.

21. The non-transitory computer readable medium of claim 15, wherein the retrieved identified set of files are stored in encrypted form.

* * * * *